United States Patent
Hoffjann et al.

(10) Patent No.: US 8,640,439 B2
(45) Date of Patent: Feb. 4, 2014

(54) HYBRID DRIVE FOR AN AIRCRAFT

(75) Inventors: Claus Hoffjann, Hamburg (DE); Hansgeorg Schuldzig, Jork (DE); Andreas Westenberger, Buxtehude (DE)

(73) Assignee: Airbus Operations GmbH (DE)

( * ) Notice: Subject to any disclaimer, the term of this patent is extended or adjusted under 35 U.S.C. 154(b) by 1552 days.

(21) Appl. No.: 11/998,437

(22) Filed: Nov. 29, 2007

(65) Prior Publication Data

US 2009/0293494 A1 Dec. 3, 2009

Related U.S. Application Data

(60) Provisional application No. 60/861,666, filed on Nov. 29, 2006.

(30) Foreign Application Priority Data

Nov. 29, 2006 (DE) .......................... 10 2006 056 354

(51) Int. Cl.
*F02C 3/30* (2006.01)
*F01B 21/04* (2006.01)

(52) U.S. Cl.
USPC ........................................ 60/39.55; 60/718

(58) Field of Classification Search
USPC ........ 60/39.53, 772, 788, 787, 39.15, 39.163, 60/39.55, 698, 716, 718, 775, 39.3
See application file for complete search history.

(56) References Cited

U.S. PATENT DOCUMENTS

| | | | |
|---|---|---|---|
| 5,244,167 A * | 9/1993 | Turk et al. ..................... | 244/12.1 |
| 6,065,115 A | 5/2000 | Sharangpani et al. | |
| 6,116,016 A * | 9/2000 | Wada et al. ................... | 60/39.17 |
| 6,296,957 B1 | 10/2001 | Graage | |
| 6,439,831 B1 * | 8/2002 | Conrad ............................. | 415/1 |
| 7,036,314 B2 * | 5/2006 | Hoffjann et al. ................ | 60/645 |
| 2003/0075643 A1 | 4/2003 | Dunn | |
| 2004/0137288 A1 * | 7/2004 | Morgenstern ................... | 429/17 |

FOREIGN PATENT DOCUMENTS

| | | |
|---|---|---|
| DE | 1197280 | 7/1965 |
| DE | 19525267 C2 | 1/1997 |
| DE | 19544927 A1 | 4/1997 |
| DE | 19821952 C2 | 11/1999 |
| DE | 19781850 B4 | 9/2007 |
| EP | 1354794 | 10/2003 |
| WO | 02053403 A2 | 7/2002 |

\* cited by examiner

*Primary Examiner* — Andrew Nguyen
(74) *Attorney, Agent, or Firm* — Lerner, David, Littenberg, Krumholz & Mentlik, LLP

(57) ABSTRACT

A drive device for an aircraft comprises a gas turbine apparatus for generating a first drive energy and electric motor for generating a second drive energy. The gas turbine apparatus and the electric motor are set up in such a way that the drive unit may be provided with at least one of the first drive energy and the second drive energy. The drive unit is set up to generate propulsion using at least one of the first drive energy and the second drive energy.

6 Claims, 3 Drawing Sheets

HYBRID DRIVE FOR AN AIRCRAFT

CROSS-REFERENCE TO RELATED APPLICATIONS

This application claims the benefit of the filing date of U.S. Provisional Patent Application No. 60/861,666 filed Nov. 29, 2006, the disclosure of which is hereby incorporated herein by reference.

BACKGROUND OF THE INVENTION

The present invention relates to a drive device for an aircraft, a method for driving an aircraft, as well as the use of a drive device in an aircraft and an aircraft having a drive device.

The percentage of air traffic currently makes up a small percentage of the worldwide petroleum consumption and air pollution. However, this percentage increases with the reduction of other air-contaminating modes of transport and the increase of air traffic. In addition, the current civil commercial aircraft have come to a point in their improvement potential and development potential at which slight improvements may be achieved only by very great effort.

Therefore, the attempt is being made either to make the harmful gases of the aircraft drives more environmentally compatible through specific types of fuel or to reduce the fuel consumption through specific drive systems.

On one hand, aircraft having mixed drives are known for reducing the pollutants. The propulsion of the aircraft is achieved by a combination of various engines and/or drive units. Current combinations are, for example, reciprocating engines and jet engines, reciprocating engines and rocket engines, jet engines and rocket engines, or turbojet engines and ramjet engines. These mixed drives have been implemented, for example, in the experimental aircraft Mikojan-Gurewitsch MiG-13 or the Nord 1500 Griffon. Every mixed drive has multiple drive units having an associated engine. A reciprocating engine has a piston engine for generating drive energy and an air propeller, for example, while the jet engine has a combustion chamber for generating drive energy and a compressor. If propulsion using one drive unit, such as the reciprocating engine, is not required, the air propeller stops in the air flow and generates an air resistance.

Furthermore, fuel-cell technology is known for generating electrical energy, from which electrical energy and water may be generated from a hydrogen-containing fuel and an oxidant.

SUMMARY OF THE INVENTION

Among other things, it may be an object of the present invention to provide a drive device having a low pollutant discharge.

According to an exemplary embodiment of the present invention, a drive device for an aircraft is provided. The drive device comprises a drive unit, a gas turbine apparatus for generating a first drive energy, and an electric motor for generating a second drive energy. The gas turbine apparatus and the electric motor are adapted for providing at least one of the first drive energy and the second drive energy to the drive unit. The drive unit is adapted for generating propulsion at least using at least one of the first drive energy and the second drive energy.

According to a further exemplary embodiment, a method for driving an aircraft is provided. A first drive energy is generated using a gas turbine apparatus. A second drive energy is generated using an electric motor. At least one of the first drive energy and one of the second drive energy is provided to the drive unit. Propulsion is generated using the drive unit.

According to a further exemplary embodiment, a drive device as described above is used in an aircraft.

According to a further exemplary embodiment, an aircraft having a drive device as described above is provided.

The term "drive unit" may be understood to mean apparatuses which may generate propulsion of an aircraft. This may be a propeller or an air propeller, for example, which generates propulsion of the aircraft because of its rotation. In addition, for example, a compressor stage or a fan of an aircraft engine may represent a drive unit, because the fan or the compressor blades generate an air flow and thus propulsion. A further drive unit may comprise a rocket drive or a ramjet engine. Using the drive unit, such as a propeller, a compressor stage, or a so-called fan of a jet engine, acceleration and/or deceleration of air masses entering at the front and exiting at the rear may be provided.

The term "drive energy" may be understood as the energy which the drive unit requires to be able to generate propulsion of the aircraft. Drive energy may be transmitted to a shaft in the form of a torque, for example.

Using the drive device described above, a hybrid drive for aircraft may be provided, which may generate drive energy on one hand through a gas turbine and on the other hand through electric motor. Thus, for example, using excess energy, an electric motor may generate additional drive energy without providing an increased fuel supply to the gas turbine apparatus. In addition, if there is a lesser demand for propulsion, drive energy may solely be generated using the electric motor, for example.

Therefore, a single drive device may be provided with different drive energies from a gas turbine apparatus and an electric motor, so that the effectiveness of the drive device may be improved and adjusted. This reduces the fuel consumption and thus the pollutant discharge.

According to a further exemplary embodiment, the drive device also comprises a water injection apparatus. The gas turbine apparatus further comprises a combustion chamber having a combustion process. The water injection apparatus is set up to inject injection water into the combustion process. Injection water may thus be injected into the combustion process and/or in the flow direction shortly after the combustion process, to thus cool off the combustion process. For example, the formation of nitrogen oxides is reduced because of the cooling of this combustion process. The pollutant discharge of the drive device may thus be reduced.

Furthermore, steam simultaneously arises in the combustion chamber via the injection of injection water into the combustion process. The density and/or the viscosity of the flow medium which flows through the gas turbine apparatus are thus increased. Higher efficiency of the overall process of the gas turbine apparatus may thus be achieved.

According to a further exemplary embodiment, the injection water may be provided from a separate tank or from industrial water. The term "industrial water" is understood as water which has already been used, which has already been applied in other applications. Thus, industrial water may be the wastewater of a flushing apparatus or a toilet apparatus, for example. The industrial water may be previously purified using filters, so that only extremely small particles or no particles are present in the industrial water. The injection water may additionally be stored in a separate tank and be refilled at the airports, for example.

According to a further exemplary embodiment, the drive device further comprises a driveshaft. The driveshaft is set up to provide at least one of the first drive energy and the second drive energy. The driveshaft may be connected to the drive unit and transmit the drive energies, such as a torque, to the drive unit. The driveshaft is set up in such a way that it may either receive a first drive energy from the gas turbine apparatus and/or a second drive energy from the electric motor.

According to a further exemplary embodiment, the drive device further comprises a gas turbine shaft and an electric motor shaft. The gas turbine shaft is set up to provide the first drive energy to the driveshaft. The electric motor shaft is set up in such a way that the second drive energy may be provided to the driveshaft. Using this exemplary embodiment, the gas turbine apparatus and the electric motors may be attached at distal positions in the construction, and the first drive energy and/or the second drive energy may be transmitted using the gas turbine shaft and the electric motor shaft to the driveshaft.

According to a further exemplary embodiment, the drive device further comprises a first clutch apparatus. The first clutch apparatus is set up in such a way that at least one of the gas turbine shaft and the electric motor shaft may be coupled using the driveshaft. Therefore, for example, either the gas turbine shaft or the electric motor shaft may be permanently connected to the driveshaft, while the other gas turbine shaft and electric motor shaft may be switched in using the first clutch apparatus. Thus, for example, the first drive energy of the gas turbine apparatus or the second drive energy of the electric motor may be switched in flexibly and variably. Therefore, the required drive energy of the drive unit may be tailored to a specific propulsion demand using the first clutch apparatus. Thus, for example, in a climbing flight phase, the gas turbine shaft, simultaneously with the electric motor shaft, may provide a first drive energy and a second drive energy simultaneously to the drive unit, or in the case of a descent or during cruising, for example, the second drive energy of the electric motor may be exclusively connected to the driveshaft to provide a propulsion. Therefore, the required drive energy may be tailored to specific flight phases, so that the fuel consumption and thus the pollutant discharge may be reduced. For example, during the starting phase of the gas turbine apparatus, the second drive energy of the electric motor may be coupled to the driveshaft and/or the gas turbine shaft using the first clutch apparatus, so that sufficient rotation may be provided for igniting the gas turbine device.

According to a further exemplary embodiment, the drive device further comprises a second clutch apparatus and a third clutch apparatus. The second clutch apparatus is set up to connect the gas turbine shaft to the driveshaft. The third clutch apparatus is set up to connect the electric motor shaft to the driveshaft. Using the second clutch apparatus and the third clutch apparatus, neither the gas turbine apparatus nor the electric motor may be permanently connected to a drive unit. Thus, the drive energy may alternately be drawn from the gas turbine apparatus or from the electric motor, so that the number of operating hours may be divided onto both of them and wear of the gas turbine and the electric motor is reduced and costs are thus saved.

According to a further exemplary embodiment, the drive device further comprises a fuel-cell system. The fuel-cell system is set up to generate injection water and electrical energy using reaction of a hydrogen-containing fuel and an oxidant. The fuel-cell system is set up to provide the electrical energy to the electric motor.

The term "fuel-cell system" is understood as one or multiple fuel cells. Each fuel cell comprises two electrodes, which are separated from one another by a diaphragm or an electrolyte. The anode comprises the hydrogen-containing fuel washing around it, which is oxidized there. The cathode side comprises the oxidant washing around it, which is reduced there. Electrical energy and water thus arise.

For example, pure hydrogen, methane, methanol, or glucose solutions may be used as the hydrogen-containing fuel. Furthermore, reformate gases are usable, in which hydrogen is provided in bound form.

For example, pure oxygen, hydrogen peroxide, potassium thiocyanate, or also air oxygen may be used as the oxidant.

Therefore, sufficient electrical energy may be generated in an economic and ecological way via the use of a fuel-cell system for providing electrical energy. On one hand, the use of fossil fuels may be dispensed with, on the other hand, the educts, such as the water, may be used further in greatly varying apparatuses. The economical and ecological energy balance may thus be improved.

According to a further exemplary embodiment, the fuel-cell system is set up to provide the injection water to a water supply system. The water supply system may comprise flushing water for toilets, for example. In addition, the water supply system may be set up to treat the injection water using appropriate post-treatment and filtering, for example, a pH value having to be set or desalination having to be completed, so that drinking water may be provided. The quantity of drinking water which is carried along may thus be reduced, by which weight and thus pollutant discharge are able to be reduced.

According to a further exemplary embodiment, the hydrogen-containing fuel is selected from the group comprising pure hydrogen and hydrogen-containing reformate gas.

According to a further exemplary embodiment, the oxidant is selected from the group comprising cabin air, outside air, and pure oxygen. For example, if the cabin air is used as the oxidant, for the air supply of the fuel-cell system, the differential pressure between the cabin air and the outside air may be employed for the purpose of ensuring the air transport through the fuel-cell system. Therefore, complex ventilator apparatuses may be dispensed with, by which energy may be saved.

According to a further exemplary embodiment, the fuel-cell system is selected from the group comprising high-temperature fuel cells, such as SOFC (Solid Oxide Fuel Cell), moderate-temperature fuel cells, and low-temperature fuel cells, such as a PEMFC (Proton Exchange Membrane Fuel Cell). For example, condensed injection water may be obtained at the anode of the high-temperature fuel cell and at the cathodes of the low and moderate-temperature fuel cells.

According to a further exemplary embodiment, the injection water may be provided using the fuel-cell system. Therefore, additional water injection tanks may be dispensed with, so that weight and installation space may be reduced.

The designs of the drive devices apply for the method, the use of the drive device, and the aircraft, and vice versa.

BRIEF DESCRIPTION OF THE DRAWINGS

In the following, exemplary embodiments are described in greater detail with reference to the attached drawings for further explanation and better understanding of the present invention.

DETAILED DESCRIPTION

Figure 1:
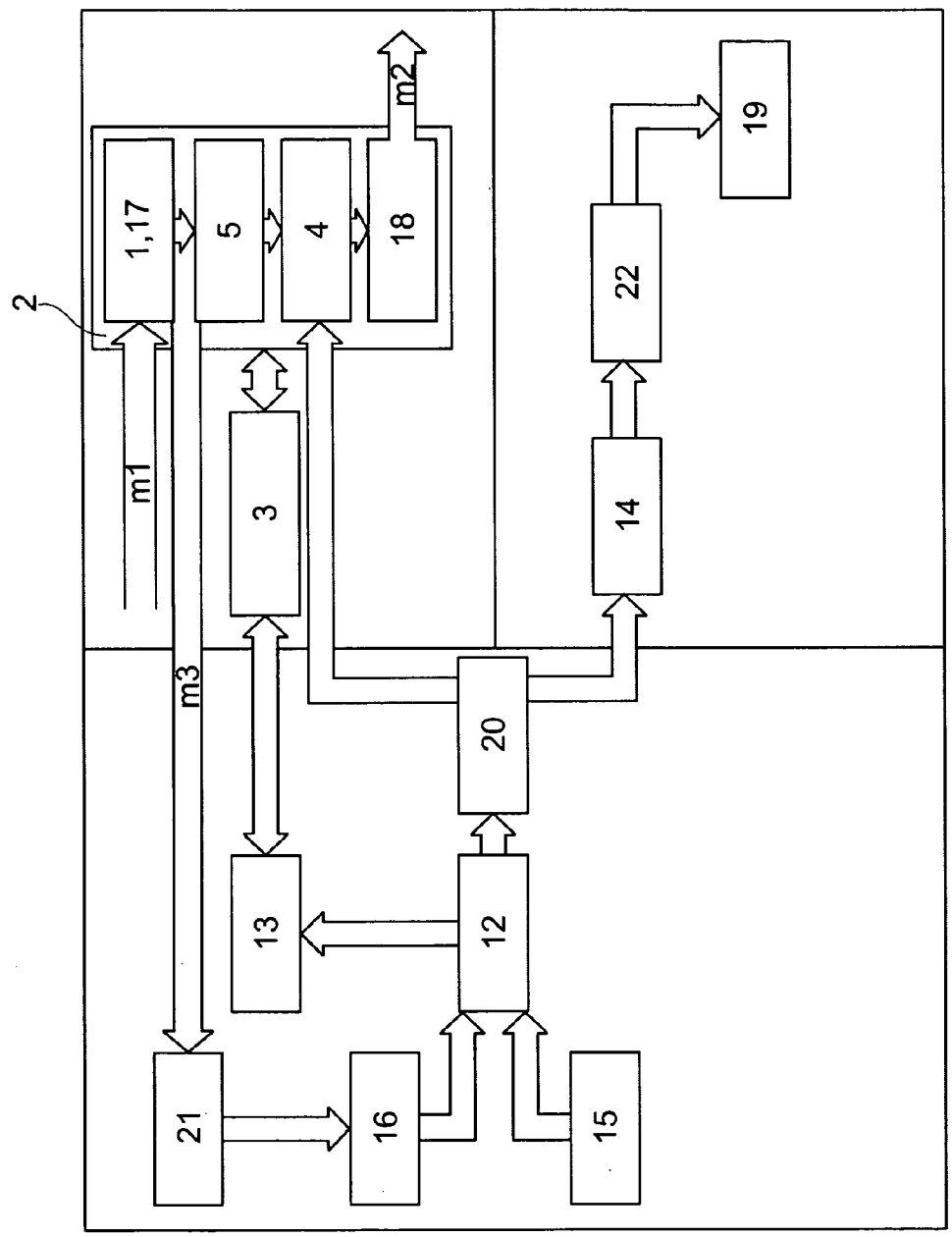
FIG. 1 shows a schematic illustration of a hybrid drive device according to an exemplary embodiment of the present invention.

Identical or similar components in different figures are provided with identical reference numerals. The illustrations in the figures are schematic and are not to scale.

FIG. 1 shows an exemplary embodiment of the drive device for an aircraft. The drive device comprises a drive unit 1, a gas turbine apparatus 2 for generating a first drive energy, and an electric motor 3 for generating a second drive energy. The gas turbine apparatus 2 and the electric motor 3 are set up in such a way that the drive unit 1 may be provided with at least one of the first drive energy and the second drive energy. The drive unit 1 is set up to generate propulsion using at least one of the first drive energy and the second drive energy.

Furthermore, the drive device comprises a water injection apparatus 4. The gas turbine apparatus 2 comprises a combustion chamber 5, from which a compressor stage 17 is connected downstream, and a turbine stage 18. For example, the water injection apparatus 4 may be situated between the combustion chamber 5 and the turbine stage 18. Inflow air m1 is compressed using the compressor stage 17 and provided to the combustion chamber 5. Bleed air m3 for the air-conditioning system 21, for example, may be bled off between the compressor stage 17 and the combustion chamber 5, so that cabin air 16 may also be provided as the oxidant to the fuel-cell system 12. Exhaust gas m2 is discharged after the turbine stage 18.

Therefore, by injecting water, the combustion process may be cooled down in the combustion chamber 5 or after the combustion chamber 5, by which the formation of nitrogen oxides is reduced. Furthermore, steam may result simultaneously via the injection of injection water into the combustion process of the combustion chamber 5. The density and/or the viscosity of the flow medium which flows through the gas turbine apparatus 2 thus increase. Higher efficiency of the overall process of the gas turbine apparatus 2 may thus be achieved and fuel may therefore be saved.

The injection water may be provided from a separate tank or a wastewater system 19, for example. The wastewater system 19 contains industrial water which has already been used by the consumers 22, for example.

Furthermore, the drive device comprises a fuel-cell system 12. The fuel-cell system 12 is set up to generate injection water and electrical energy by reaction of a hydrogen-containing fuel 15 and an oxidant 16. Furthermore, the fuel-cell system 12 is set up to provide the electrical energy 13 to the electric motor 3.

The generated injection water may be provided to a condenser 20. Subsequently, the injection water may be fed to a water supply system 14 or a water injection apparatus 4.

The hydrogen 15 may be provided from a tank or from a hydrogen-containing reformate gas, in which the hydrogen is provided in bound form, for example. The oxidant 16 may comprise the cabin air, for example, which an air-conditioning system may provide.

Figure 2:
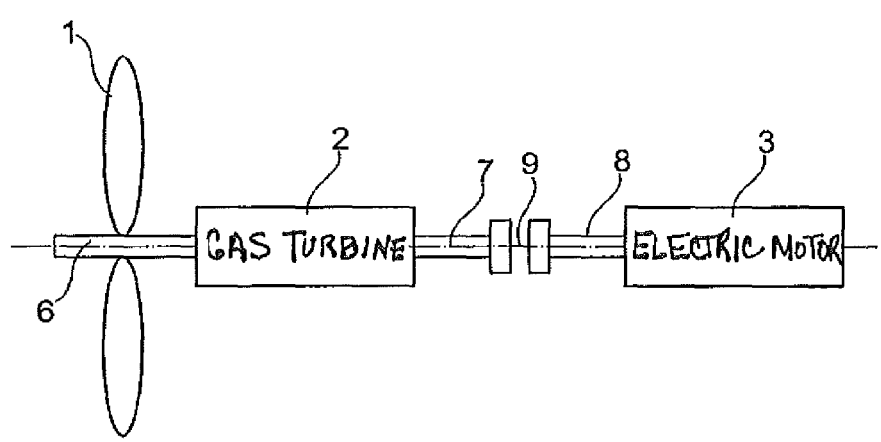
FIG. 2 shows a schematic illustration of an exemplary embodiment of the present invention having a clutch apparatus.

FIG. 2 shows an exemplary embodiment of the present invention, in which the gas turbine apparatus 2 and the electric motor 3 are coupled using a gas turbine shaft 7 and an electric motor shaft 8 to a drive shaft 6. The driveshaft 6 transmits a torque to the drive unit 1. The drive unit 1 may comprise a propeller or a fan and/or a compressor stage 17 of a jet engine, for example. Using a first clutch apparatus 9, the electric motor 3 may be coupled alternately using the electric motor shaft 8 to the driveshaft 6. The gas turbine shaft 7 of the gas turbine apparatus 2 may be situated in between, for example.

Therefore, as shown in FIG. 2, the second drive energy of the electric motor 3 may alternately provide a second drive energy to the drive unit 1 using the first clutch apparatus 9. For example, if the second drive energy of the electric motor 3 is not required for generating propulsion, it may be decoupled using the clutch apparatus 9. In the exemplary embodiment shown in FIG. 2, the electric motor 3 may also be used as a starter. Thus, at a standstill, the electric motor 3 may generate a starting torque using the electric motor shaft 8 and thus rotate the gas turbine shaft 7, so that a sufficient starting torque is provided to the gas turbine apparatus 2 to start it.

Figure 3:
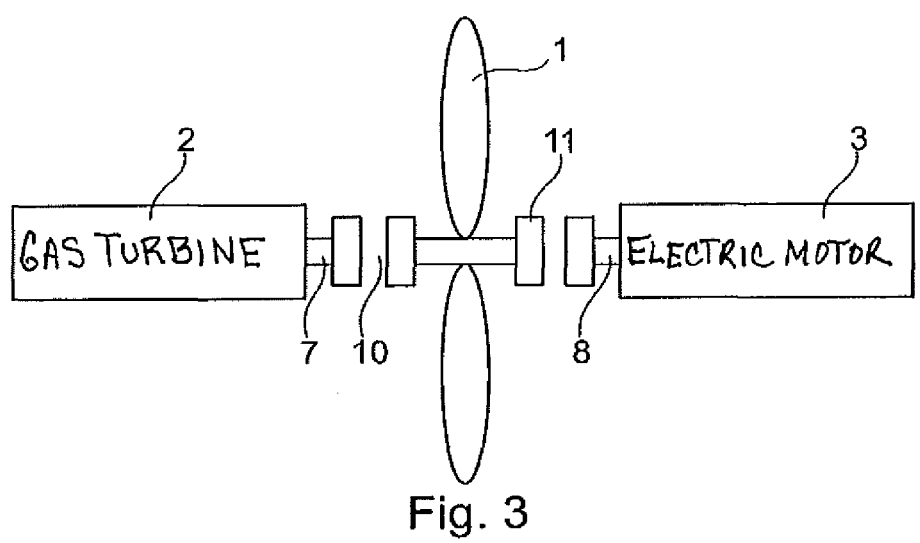
FIG. 3 shows a schematic illustration of a further exemplary embodiment having two clutch apparatuses.

FIG. 3 shows a further exemplary embodiment having a second clutch apparatus 10 and a third clutch apparatus 11. The second clutch apparatus 10 is set up to connect the gas turbine shaft 7 to the driveshaft 6. The third clutch apparatus 11 is set up to connect the electric motor shaft 8 to the driveshaft 6. Thus, a specific first drive energy and/or second drive energy may be provided to the drive unit 1 alternately via the second and third clutch apparatuses 10, 11.

For example, if less drive energy is required, the gas turbine shaft 7 or the electric motor shaft 8 may be decoupled using the second or third clutch apparatus 10, 11, so that only the other driveshaft 7, 8 provides the first or second drive energy. Unnecessary idling of the possibly still connected other driveshaft 7, 8 and thus idle rotation of the gas turbine apparatus 2 or the electric motor 3 is thus avoided, so that a loss, because of a friction loss, for example, is reduced. Therefore, fuel consumption and thus the pollutant discharge may be reduced.

Furthermore, the fuel-cell system may also provide electrical energy for other consumers present in an aircraft, such as onboard illumination or the air-conditioning system 21. In addition, the excess electrical energy of the fuel cell 12 may be fed to a storage unit, such as a battery.

Moreover, it is to be noted that "comprising" does not exclude other elements or steps and "a" or "an" does not exclude multiples. Furthermore, it is to be noted that features or steps which have been described with reference to one of the above exemplary embodiments may also be used in combination with other features or steps of other exemplary embodiments described above. Reference numerals in the claims are not to be viewed as a restriction.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE NUMERALS 1. drive unit
2. gas turbine apparatus
3. electric motor
4. water injection apparatus
5. combustion chamber
6. driveshaft
7. gas turbine shaft
8. electric motor shaft
9. first clutch apparatus
10. second clutch apparatus
11. third clutch apparatus 12. fuel-cell system
13. electrical energy
14. water supply system
15. hydrogen-containing fuel
16. oxidant
17. compressor stage, fan
18. turbine stage
19. wastewater system
20. condenser
21. air-conditioning system
22. consumer, passengers
m1 inflow air
m2 exhaust gas
m3 bleed air

The invention claimed is:

1. A method for driving an aircraft comprising:
generating a first drive energy using a gas turbine apparatus;
generating a second drive energy using an electric motor;
generating injection water and electrical energy by a fuel-cell system by using a hydrogen-containing fuel and an oxidant;
providing the injection water to a condenser;
providing the electrical energy to the electric motor;
injecting the injection water from the condenser into a combustion process in a combustion chamber of the gas turbine apparatus;
providing at least one of the first drive energy and the second drive energy to a drive unit via a first drive shaft of one of the gas turbine apparatus and the electric motor selectively coupled to the drive unit;
selectively providing the other of the first drive energy and the second drive energy via a second drive shaft of the other of the gas turbine apparatus and the electric motor selectively coupled to the first drive shaft via a first clutch apparatus; and
generating propulsion using the drive unit.

2. An aircraft having a drive device, the drive device comprising:
a drive unit;
a gas turbine apparatus for generating a first drive energy, the gas turbine apparatus having a gas turbine shaft selectively coupled to the drive unit;
an electric motor for generating a second drive energy;
a first clutch apparatus;
a water injection apparatus; a fuel-cell system; and
a condenser;
wherein the electric motor is configured to be selectively coupled to the gas turbine shaft via the first clutch apparatus,
wherein the gas turbine apparatus and the electric motor are adapted for providing the drive unit with at least one of the first drive energy and the second drive energy;
wherein the drive unit is adapted for generating propulsion using at least one of the first drive energy and the second drive energy;
wherein the fuel-cell system is adapted for generating injection water and electrical energy by using a hydrogen-containing fuel and an oxidant;
wherein the fuel-cell system is adapted for providing electrical energy to the electric motor;
wherein the fuel-cell is adapted for providing the injection water to the condenser;
wherein the gas turbine apparatus comprises a combustion chamber with a combustion process; and
wherein the water injection apparatus is adapted for injecting injection water, provided by the fuel-cell system to the condenser, into the combustion process.

3. The aircraft of claim 2,
wherein the injection water is provided from one of a separate tank and from industrial water.

4. The aircraft of claim 2,
wherein the hydrogen-containing fuel is selected from the group consisting of pure hydrogen and hydrogen-containing reformate gas.

5. The aircraft of claim 2,
wherein the oxidant is selected from the group consisting of cabin air, outside air, and pure oxygen.

6. The aircraft of claim 2,
wherein the fuel-cell system is selected from the group consisting of high-temperature fuel cells, moderate-temperature fuel cells, and low-temperature fuel cells.

* * * * *